United States Patent [19]
McCormick et al.

[11] Patent Number: 5,748,005
[45] Date of Patent: May 5, 1998

[54] RADIAL DISPLACEMENT SENSOR FOR NON-CONTACT BEARINGS

[75] Inventors: John A. McCormick; Herbert Sixsmith, both of Norwich, Vt.

[73] Assignee: Creare, Inc., Hanover, N.H.

[21] Appl. No.: 550,709

[22] Filed: Oct. 31, 1995

[51] Int. Cl.[6] .................................................. G01R 29/00
[52] U.S. Cl. ................................. 324/662; 310/90.5
[58] Field of Search ................................ 324/661, 662, 324/658, 678, 679, 686; 310/90.5; 340/870.37

[56] References Cited

U.S. PATENT DOCUMENTS

| | | |
|---|---|---|
| 3,066,849 | 12/1962 | Beams . |
| 3,334,949 | 8/1967 | Atkinson ..................... 310/90.5 |
| 3,490,816 | 1/1970 | Lyman . |
| 3,642,334 | 2/1972 | Atkinson ..................... 310/90.5 |
| 3,650,581 | 3/1972 | Boden et al. . |
| 3,698,775 | 10/1972 | Gilbert . |
| 3,731,984 | 5/1973 | Habermann et al. . |
| 3,742,347 | 6/1973 | Walton ....................... 324/662 X |
| 3,785,709 | 1/1974 | Atkinson ..................... 310/90.5 |
| 3,787,100 | 1/1974 | Habermann et al. . |
| 3,845,996 | 11/1974 | Geweke . |
| 3,891,285 | 6/1975 | Atkinson ..................... 310/90.5 |
| 3,918,310 | 11/1975 | Evans et al. . |
| 4,065,189 | 12/1977 | Sikorra . |
| 4,078,436 | 3/1978 | Staats ......................... 310/90.5 X |
| 4,121,143 | 10/1978 | Habermann et al. . |
| 4,154,489 | 5/1979 | Lyman . |
| 4,165,438 | 8/1979 | Holdren et al. ................... 324/661 |
| 4,245,869 | 1/1981 | Scheffer et al. . |
| 4,389,646 | 6/1983 | Tago ........................... 324/662 X |
| 4,392,693 | 7/1983 | Habermann et al. . |
| 4,417,772 | 11/1983 | Robinson . |
| 4,562,430 | 12/1985 | Robinson . |
| 4,823,071 | 4/1989 | Ding et al. . |
| 4,864,295 | 9/1989 | Rohr . |
| 4,864,300 | 9/1989 | Zaremba . |
| 4,920,290 | 4/1990 | Murakami et al. . |

*Primary Examiner*—Michael Brock
*Attorney, Agent, or Firm*—Wood, Herron & Evans, L.L.P.

[57] ABSTRACT

A radial position sensor includes four capacitive electrodes oriented about a shaft, arranged in two diametrically opposite pairs. Sensor circuitry generates an output signal in proportion to the capacitance between the electrodes and the shaft; the capacitance between an electrode and the shaft increases as the shaft approaches the electrode and decreases as the shaft recedes from the electrode. The sensor circuitry applies an alternating voltage to one electrode of a pair and a 180 degree out of phase alternating voltage to the other electrode of the pair. The electrical responses of the two electrodes to their respective input signals are summed to form a radial deviation signal which is relatively free from the alternating voltage and accurately represents the position of the shaft relative to the electrodes of the pair.

9 Claims, 2 Drawing Sheets

RADIAL DISPLACEMENT SENSOR FOR NON-CONTACT BEARINGS

This invention was made with Government support under contracts NAS5-30854 and NAS5-31475 awarded by NASA. The Government has certain rights in this invention.

FIELD OF THE INVENTION

This invention relates to sensors for determining the distance by which a shaft is radially displaced from the center of a non-contact bearing such as a magnetic bearing or an air bearing.

BACKGROUND OF THE INVENTION

Space-borne surveillance sensors utilize miniature cryogenic turbomachines such as expansion turbines and compressors. These turbomachines use shafts that have very small shaft diameters, typically less than a ¼", and run at very high speeds, usually 500,000 rpm or greater. To support the shaft in the turbomachine, non-contact gas bearings are used because they virtually eliminate the frictional losses and contamination associated with conventional liquid lubricated sleeve or rolling element bearings. One problem with gas bearings is their need to run at relatively warm temperatures. At cryogenic temperatures, the viscosity of the gas decreases and this reduces the load capacity and stiffness of the bearing.

An alternative type of non-contacting bearing which has been proposed for use in cryogenic turbomachines is an electromagnetic bearing. Electromagnetic bearings typically comprise a stator, a rotor or shaft, a control circuit external to the machine, and a set of shaft position sensors proximate the rotor. The stator is usually constructed of laminations of magnetic material with a small number of non-magnetic laminations interspersed for cooling. These laminations have openings which are aligned with one another and through which electrical conductors are wrapped to form AC control coils. Mounted circumferentially about the rotor is a permanent magnet or DC coil which generates a magnetic flux having an axial component aligned with the axis of shaft. The AC control coils are positioned along two mutually orthogonal axes which intersect at the radial center of the shaft and the stator. Alternating currents applied to the control coils induce magnetic fields in the annular gap between the stator and the shaft. These fields act upon the shaft to control its radial position with respect to the stator.

To detect radial displacement of the shaft from the center of the annular gap between the stator and the shaft, radial position sensors have been developed. Such sensors are typically provided in pairs for each control axis and each sensor of the pair is mounted about the shaft diametrically opposed to the other sensor of the pair. As the shaft is radially displaced from the center, one sensor detects an increase in the radial gap while the opposed sensor detects a decreasing radial gap. Each sensor generates an error or radial deviation signal which has a magnitude which is proportional to the size of the gap and a polarity which indicates the direction of the shaft displacement. These error signals are used by a control circuit which responds by increasing the magnitude of the current in one control coil and decreasing the magnitude of the current through a diametrically opposed control coil so as to weaken the magnetic field acting on the shaft in the region of the smaller radial gap and to strengthen the magnetic field in the region of the widening radial gap. As the shaft is returned to the equilibrium position by the changing magnetic fields, the sensors detect the radial shift and generate error signals that are used by the control circuit to balance the currents in the control coils.

Radial position sensors used with electromagnetic bearings typically measure the electrical impedance between a stationary electrode and the surface of the shaft. The electrode and its associated electronic circuitry are configured such that the electrical impedance varies linearly with the gap to be measured. To measure electrical impedance, the electrode is typically excited with a radio frequency carrier signal. It is desirable that the output radial deviation signal produced by the sensor be free of this radio frequency signal.

Known position sensors of this type are normally too large to be incorporated in a bearing for a miniature cryogenic turbomachine. The position detecting sensors must be mounted axially adjacent to the stator. Only minimal axial space is available to be occupied by the these sensors in current designs for miniature cryogenic turbomachines. In addition, some previously known sensors do not produce an output signal free from a radio frequency carrier signal.

These physical dimension and signal generation problems are exemplified by the position detection sensor of U.S. Pat. No. 4,562,430. This sensor uses four thin metal foil electrodes which are mounted to the stator to form a discontinuous ring. A continuous thin foil electrode is also mounted to the stator at a short distance on the stator from the discontinuous ring. A pick-up electrode is mounted to the rotor so that a portion of the pick-up electrode is opposite the continuous ring and another portion is opposite the electrodes of the discontinuous ring. Current from an alternating current source or RF oscillator connected to the continuous ring is capacitively coupled to the pick-up electrode on the rotor which is, in turn, capacitively coupled to one of the four electrodes on the stator. The capacitive charging of the opposed pairs of the four electrodes in the discontinuous ring is used to generate a radial deviation signal indicative of the radial displacement of the shaft.

The electrodes of this sensor do not produce an error signal free from the alternating current coupled from the continuous ring to the pick-up electrode and then to the electrode pairs. Instead, a radio frequency (RF) AC component, which typically requires filtering for removal, appears superimposed upon the desired error signal. The need for filtering circuitry adds to the complexity of the device and can adversely affect the stability of shaft position control. The physical dimensions of the thin metal foil electrodes in this sensor are also too large for use in cryogenic turbomachines as the spacings needed between the continuous ring and the electrodes in the discontinuous ring are too large. Finally, the sensor in U.S. Pat. No. 4,562,430 requires the mounting of electrodes to both the stator and the rotating member. Such mounting is virtually impossible to accomplish reliably on parts as small as those in a cryogenic turbomachine.

In view of the foregoing, it can be appreciated that there is a need for a simple radial position sensor for a shaft which can be adapted to the small dimensions of the cryogenic turbomachine without requiring the mounting of electrodes on very small parts. There is also a need for a sensor which produces error signals relatively free from interfering signals from the RF oscillator, even when using small dimension sensor elements such as those required for application in a cryogenic turbomachine.

SUMMARY OF THE INVENTION

To solve the above-referenced problems of previously known radial position sensors for electromagnetic bearings, a radial position sensor built in accordance with the principles of the present invention includes first and second electrical parameter sensors which are located diametrically opposite one another in proximity to a rotor or shaft of an electromagnetic bearing. The sensors generate an output signal in proportion to an electrical parameter that varies with the distance between each sensor and the shaft. The first and second sensors define a control axis for the shaft. A third and fourth sensor may be placed diametrically opposite one another to define a second control axis lying orthogonal with respect to the first control axis. The electrical parameter which alters the output of the sensors is inversely varied when the shaft is displaced from a position equidistant from a pair of diametrically opposed sensors, i.e., the electrical parameter increases as the shaft recedes from one sensor while the parameter decreases as it approaches the other sensor of the pair. A first alternating signal is applied to one sensor of the sensor pair and a second alternating signal which is out-of-phase, and preferably 180° out-of-phase, with the first signal is applied to the second sensor of the sensor pair.

Each sensor of the pair has two output nodes, one of positive polarity and one of negative polarity. The positive and negative output nodes for the first sensor contain radial deviation signals of positive and negative polarity, respectively, superposed on the first alternating signal. The positive and negative output nodes for the second sensor contain radial deviation signals of positive and negative polarity, respectively, superposed on the out-of-phase alternating signal. For either sensor, an increase in the value of an electrical parameter makes the radial deviation component of the signal at the positive output node more positive, and makes the radial deviation component of the signal at the negative output node more negative. Conversely, a decrease in the value of the same electrical parameter makes the radial deviation component of the signal at the positive output node less positive, and makes the radial deviation component of the signal at the negative output node less negative.

A potential divider averages the output signal at the positive node of the first sensor with the output signal at the negative node of the second sensor. A second potential divider averages the output signal at the negative node of the first sensor with the output signal at the positive node of the second sensor. At each potential divider output, the first alternating signal applied to the first sensor is nearly cancelled by the out-of-phase alternating signal applied to the second sensor. The remaining signal at each potential divider output is a radial deviation signal for the shaft displacement that is relatively free of interference from the alternating signal.

The sensor is preferably constructed with capacitive electrodes mounted in the stator to define a pair of mutually perpendicular control axes about the shaft of the bearing.

It is an object of the present invention to provide a radial displacement sensor that is simple to construct and can be dimensioned to fit within a cryogenic turbomachine.

It is a further object of the present invention to eliminate or substantially reduce the AC component in the radial displacement deviation signal.

In addition to satisfying the objects just stated, the electrodes of the sensor of the present invention can be formed within a non-contact bearing such as a magnetic bearing without need of forming a laminated shaft or attaching metal foil electrodes to either the shaft or stator.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1B:
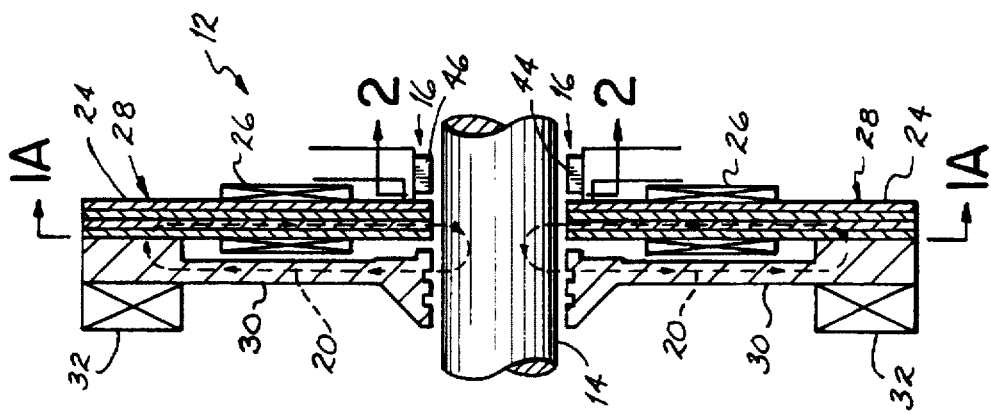
FIG. 1B is a cross-sectional view showing the stator, shaft, and sensor, and also a correction coil and passive pole not shown in FIG. 1A.

FIG. 1B is a cross-sectional view of an electromagnetic bearing 12 that supports a rotating shaft 14 and uses a sensor 16 built in accordance with the principles of the present invention. The typical turbomachine encloses components that (a) expand and cool a stream of gas through a turbine rotor, converting the work of expansion to shaft power, and converting the shaft power to electrical power, or (b) convert electrical power to shaft power, which in turn drives an impeller which compresses and heats a stream of gas. In small turbomachines for cryogenic applications, rotational speeds are very high, and materials with a high strength to mass ratio must be employed to sustain the large centrifugal forces. Typically, one or two bearings similar to bearing 12 are incorporated in a turbomachine.

Figure 1A:
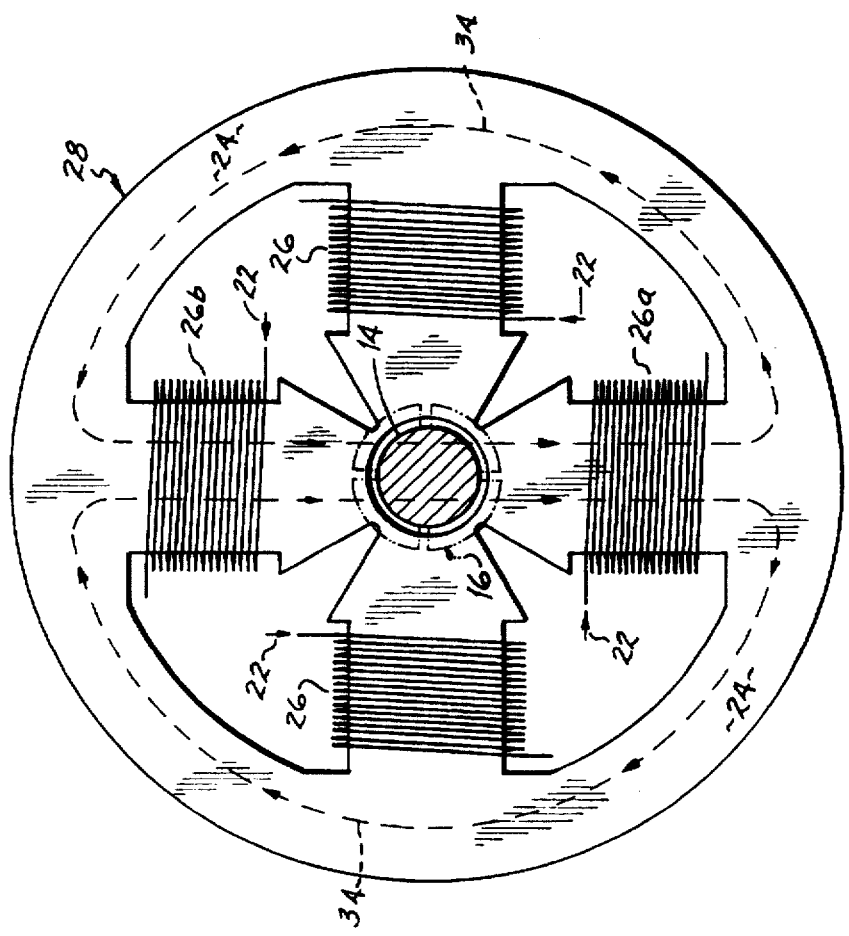
FIG. 1A is a view of a stator for an electromagnetic bearing used in a cryogenic turbomachine, showing the shaft in cross section and the location of a position sensor.

Mounted about the shaft 14 is a stator 28 that is formed from four 0.470 mm laminations of AISI M-19 silicon steel. The laminations are formed with openings which are aligned with one another so that four sixty-turn coils 26 of 28 AWG magnet wire may be wrapped about the stator in a perpendicular orientation to the shaft 14, as illustrated in FIG. 1A. Also surrounding shaft 14, axially adjacent to stator 28, is a passive pole 30 which provides a return path for magnetic bias flux which follows paths 20 illustrated in FIG. 1B.

Each of coils 26 carries a DC current flowing in the direction of arrows 22, thus producing a DC magnetic field having a north pole at the center of stator 28 adjacent to shaft 14 and a south pole at the circumferential rim 24 of stator 28. Thus, this DC magnetic field is homopolar, that is, the radially innermost surface of stator 28 is a north pole for its entire circumference around shaft 14. Bucking coil 32 (if used) carries a circumferential DC current which tends to cancel any fields that could leak from the bearing stator to an adjacent motor or generator stator.

Because shaft 14, stator 28, and passive pole 30 are made of magnetic material with high relative permeability, most of the magnetic flux is channeled through these elements rather than through the surrounding air. As shown by paths 20 in FIG. 1B, DC magnetic field emerges radially inwardly from stator 28 at its radially innermost surface adjacent shaft 14, crosses an air gap into shaft 14, travels through shaft 14 and crosses a second air gap into passive pole 30, and then passes through passive pole 30 to the outer rim 24 of stator 28.

The presence of an air gap between stator 28, passive pole 30 and shaft 14 causes shaft 14 to be attracted in the direction of each of the coils 26 in stator 28. However, the attractive force toward each of coils 26 is substantially equal, causing shaft 14 to suspend inside of stator 28.

It will be noted that shaft 14, stator 28 and passive pole 30 are subjected to the same DC magnetic flux regardless of the angle of rotation of shaft 14. Because, in the absence of a radial load there are no alternating magnetic fluxes in shaft 14 and passive pole 30, rotation of shaft 14 does not induce eddy currents and loss in shaft 14, stator 28 or passive pole 30.

A short term correction current is superimposed on the DC current flowing in coils 26, in order to control the position of shaft 14 and maintain shaft 14 in a centered position within stator 28. This correction current is generated in response to displacement of shaft 14 away from a centered position, as detected by sensor 16 in the manner described below. For example, to attract shaft 14 toward a coil 26a, the current flowing in coil 26a is increased and the current flowing in the diametrically opposed coil 26b is proportionately decreased. Similarly, to attract shaft 14 toward any other coil 26, the current in that coil 26 is increased and the current in the diametrically opposed coil 26 is proportionately decreased.

The result of a proportionate increase and decrease in current in diametrically opposed coils is a net force applied to the shaft 14, tending to draw shaft 14 toward the coil 26 which carries positive incremental current, and therefore greater total current.

The proportional increase and decrease in current in diametrically opposed coils also produces a non-homopolar incremental magnetic flux, superimposed upon the homopolar DC magnetic flux discussed above. Referring to FIG. 1A, for example, when winding 26b carries an increased current in direction 22 (i.e., a positive incremental current), and winding 26a carries a reduced current in direction 22 (i.e., a negative incremental current), an incremental non-homopolar magnetic flux is produced in stator 28 and shaft 14. This incremental magnetic flux follows paths 34 from winding 26b, through shaft 14, through winding 26a, around the outer rim 24 of stator 28, and back to winding 26b.

It will be noted that, unlike the homopolar bias flux flowing along paths 20 (FIG. 1B), the incremental flux flowing along paths 34 does not flow through passive pole 30. Therefore, no alternating or AC flux is generated in passive pole 30, eliminating the need to laminate passive pole 30 to prevent bias currents, reducing cost. It will also be noted that, although the incremental flux flows through shaft 14, the amount of this incremental flux is small compared to the bias flux described above, and the mean distance that the incremental flux travels through shaft 14 is relatively small; therefore, the eddy currents and losses induced in shaft 14 are relatively small, and shaft 14 need not be laminated to prevent eddy currents.

Mounted adjacent to stator 28 is the sensor 16 that detects the radial displacement of shaft 14 from the centered equilibrium position of the shaft within the turbomachine. Sensor 16 includes four electrodes which are circumferentially disposed in close proximity to shaft 14, as illustrated in shadow in FIG. 1A and also in FIG. 2.

Figure 2:
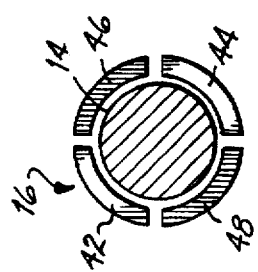
FIG. 2 is an elevational view of the position sensor and a cross-sectional view of the shaft, taken along line 2—2 of FIG. 1B.

As best seen in FIG. 2, sensor 16 comprises four brass electrodes 42, 44, 46 and 48 that are mounted in epoxy (for electrical isolation from the housing) and positioned so that a portion of each electrode is exposed to a segment of the circumference of the shaft 14. Preferably, the length of the exposed portion of an electrode is equal to the length of the exposed portion of the diametrically opposed electrode, and advantageously the exposed portions of all four electrodes are equal in length. In one specific embodiment, the exposed portions of the electrodes have an inner bore diameter of approximately 6.3 mm, an axial width of 2.03 mm and a radial clearance of 0.051 mm from shaft 14. The epoxy-filled gaps between the electrodes are 0.81 mm, so that the electrodes have a surface area of approximately 8.5 mm$^2$. These dimensions result in a nominal capacitance of 1.5 picoFarad between each electrode and the shaft. Other shapes and sizes may be used.

Figure 3:
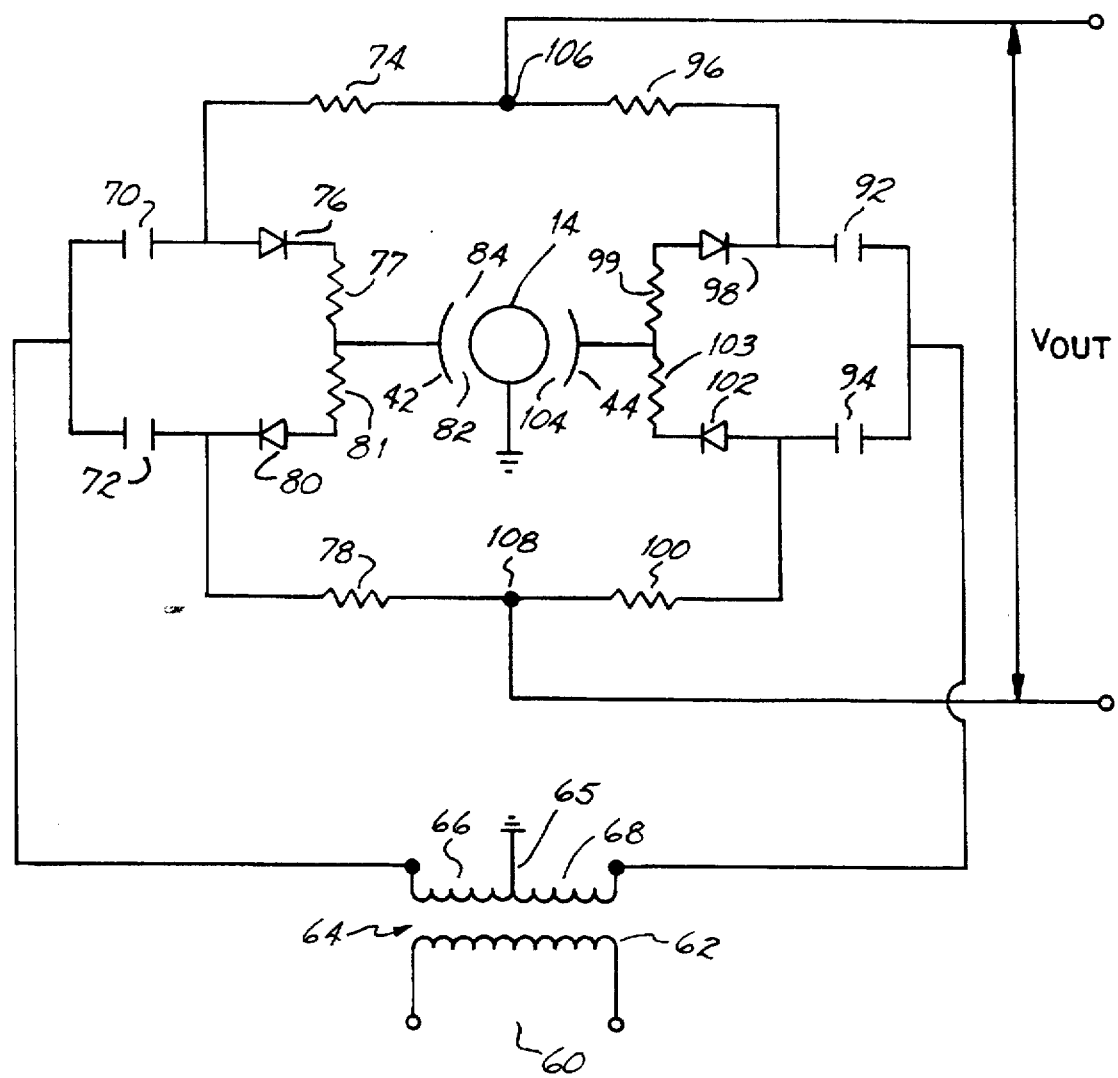
FIG. 3 is an electrical schematic of the sensor of FIG. 1B shown with associated sensor circuitry typical of that used for each axis.

Referring to FIG. 3, each diametrically opposed pair of electrodes is coupled to circuitry which produces a radial deviation signal indicating the position of the shaft with respect to the electrodes. Radio frequency source 60 provides, e.g., 2 MHz RF energy to a primary coil 62 of a power transformer 64. Transformer 64 is a center tapped transformer with the center tap 65 grounded so the signal induced in secondary coil 66 is 180° out of phase with the signal produced at secondary coil 68. The amplitudes of the RF signals produced at secondary coils 66 and 68 are roughly 11 Volts in amplitude.

Secondary coil 66 is connected to parallel 66 picoFarad capacitors 70 and 72. Capacitor 70 is connected to a 24.9 kiloohm resistor 74 and the anode of the diode 76 while capacitor 72 is connected to 24.9 kiloohm resistor 78 and the cathode of diode 80. The cathode of diode 76 and the anode of diode 80 are commonly connected to electrode 42 through 330 ohm resistors 77 and 81, respectively. Electrode 42 faces the shaft 14 across a portion of an annular gap 82. Because the shaft 14 is machined from an electrically conductive material, such as carbon steel, electrode 42 and shaft 14 act as plates of a capacitor 84 having the air in the gap 82 between them as a dielectric. The shaft 14 is an electrically conductive member surrounded by other closely spaced components which give it a relatively large capacitance to ground. This makes it in effect grounded with respect to the RF signal applied to the electrodes. Thus, charge is accumulated and discharged from the capacitor 84 through the capacitors 70, 72 and diodes 76 and 80.

With further reference to FIG. 3, secondary coil 68 is connected to parallel 66 picoFarad capacitors 92 and 94. Capacitor 92 is connected to 24.9 kiloohm resistor 96 and the cathode of diode 98 while capacitor 94 is connected to 66 kiloohm resistor 100 and the anode of diode 102. The cathode of diode 102 and the anode of diode 98 are commonly tied to electrode 44 through 330 ohm resistors 99 and 103, respectively. Electrode 44 is diametrically opposed to electrode 42 and faces the shaft 14 across another portion of the annular gap 82. Electrode 44 and shaft 14 form a capacitor 104. Resistors 74 and 96 are connected in series to form an output averaging node 106 while resistors 100 and 78 are connected in series to form an output averaging node 108. The out-of-phase RF signals from secondary coils 66 and 68 cancel out at averaging nodes 106 and 108. The difference between the voltages produced at nodes 106, 108 is the radial deviation signal and is generated by the operation of the circuit as shown below.

330 ohm resistors 77, 81, 99 and 103 are included to reduce the likelihood for damage in the case of an accidental electrical short between the electrode and the shaft such as might be caused by a particle of metallic dust. In the event of a short these resistors increase the impedance at the electrodes 42 and 44 to limit the current flowing through the diodes.

It will be noted that the capacitance values of capacitors 84 and 104 are relatively small. To ensure that these capacitance values are effectively measurable, stray capacitance in the circuit must be carefully controlled. Specifically diodes 76, 80, 98 and 102 and resistors 77, 81, 99 and 103 should be mounted inside the housing of the bearing and as closely adjacent to electrodes 42, 44, 46 and 48 as possible.

In operation, a radio frequency signal generated by an oscillator is applied to the primary coil 62 of the transformer 64. Because the center tap 65 is grounded, during the first 90° of the radio frequency cycle, a positive going waveform with respect to ground is produced in the secondary coil 66 while a negative going waveform with respect to ground is produced in secondary coil 68. Thus, the signals induced in secondary coils 66 and 68 are approximately 180° out of phase.

The time constant of capacitor 70 and resistor 74 is long compared with a cycle of the RF signal, similarly with capacitor 72 and resistor 78, with capacitor 92 and resistor 96, and with capacitor 94 and resistor 100. The time constants of capacitor 84 with resistors 74 or 78, and of capacitor 104 with resistors 96 or 100, are comparable with an RF cycle. During operation capacitors 70 and 72 become charged negatively and positively respectively. Similarly, capacitors 92 and 94 are charged positively and negatively respectively. DC current circulates counterclockwise through resistors 74, 96, 100 and 78 as capacitors 70, 92, 94 and 72 continually discharge.

The continual discharge of capacitor 70 through resistor 74 is balanced by charging that occurs during the portion of each RF cycle that diode 76 is forward biased, similarly for capacitor 92, resistor 96 and diode 98, for capacitor 94, resistor 100 and diode 102, and for capacitor 72, resistor 78 and diode 80. Due to the relatively long time constants of capacitors 70, 72, 92 and 94 their voltages and charge remain nearly constant over an RF cycle. Conversely, the voltages across capacitors 84 and 104 oscillate at the RF frequency about a DC level of zero. (The voltage across each of capacitors 70, 72, 92 and 94 is defined as the voltage from the diode terminal to the transformer secondary terminal, and the voltage across each of capacitors 84 and 104 is defined as the voltage from the electrodes 42 and 44 to ground.) The average of the voltages across capacitors 70 and 92 appears at node 106, and the average of the voltages across capacitors 72 and 94 appears at node 108. There is little or no RF voltage at these nodes since the RF voltages being averaged are of opposite polarity.

The DC voltages across capacitors 70 and 72 depend on the amplitude of the voltage oscillation across capacitor 84, which in turn depends on the capacitance of capacitor 84. Similarly, the voltages across capacitors 92 and 94 depend on the amplitude of the voltage oscillation across capacitor 104, which in turn depends on the capacitance of capacitor 104. This can be seen as follows. While the RF voltage from secondary coil 66 is rising to its maximum value, diode 76 is forward biased and capacitors 70 and 84 are charging. When this RF voltage reaches its maximum, diode 76 becomes reverse biased. At this instant, the voltage across capacitor 84 is at its maximum, establishing the magnitude of the negative DC voltage across capacitor 70 as the difference between the RF voltage amplitude and the amplitude of the voltage oscillation across capacitor 84. (The voltage drop across diode 76 while it is conducting is small in comparison to this difference in amplitudes and can be ignored.) In the preferred embodiment, the RF frequency and the resistance of resistors 74, 78, 96 and 100 are chosen such that the nominal amplitude of the voltage oscillations across capacitors 84 and 104 is roughly one-half of the amplitude of the RF voltage across secondary coils 66 and 68. This makes the DC voltage across capacitor 70 the negative of roughly one-half the RF amplitude.

At the same time the RF voltage from secondary coil 66 is approaching its maximum, the RF voltage from secondary coil 68 is approaching its minimum, forward biasing diode 98 and causing capacitor 104 to discharge and capacitor 92 to charge. Diode 98 becomes reverse biased as this RF voltage reaches its minimum at which point the voltage across capacitor 104 is at its minimum. This establishes the value of the positive DC voltage across capacitor 92 as the difference between the RF voltage amplitude and the amplitude of the voltage oscillation across capacitor 104.

Diodes 80 and 102 with capacitors 72 and 94 operate in a similar manner except that their period of forward bias occurs while the RF voltages from secondary coils 66 and 68 are approaching their minimum and maximum values, respectively. It can be seen from reasoning similar to the above that the positive DC voltage across capacitor 72 is the difference between the RF voltage amplitude and the amplitude of the voltage oscillation across capacitor 84, and that the negative DC voltage across capacitor 94 is the difference between the RF voltage amplitude and the amplitude of the voltage oscillation across capacitor 104. Thus the positive DC voltage across capacitor 72 and the negative DC voltage across capacitor 70 are equal in magnitude, and the negative DC voltage across capacitor 94 and the positive DC voltage across capacitor 92 are equal in magnitude.

The amplitudes of the voltage oscillations across capacitors 84 and 104 are inversely proportional to the respective capacitance values. Changes in voltage amplitude with capacitance represent changes in the total charge transferred to and from capacitors 84 and 104 over an RF cycle. The average charging current, which balances the DC current circulating through resistors 74, 96, 100 and 78, does not change when the capacitance of capacitors 84 and 104 changes, but the changes in charge transfer are accommodated by changes in the lengths of the time periods for which the diodes are forward biased.

When capacitors 84 and 104 have equal capacitance, corresponding to the shaft 14 being centered between electrodes 42 and 44, their voltage oscillations have the same amplitude, making the negative DC voltage across capacitor 70, the positive DC voltage across capacitor 72, the positive DC voltage across capacitor 92 and the negative DC voltage across capacitor 94 all equal in magnitude. The voltage at node 106, which is the average of the negative DC voltage across capacitor 70 and the positive DC voltage across capacitor 92, is zero, and the voltage at node 108, which is the average of the positive DC voltage across capacitor 72 and the negative DC voltage across capacitor 94 is also zero. Zero voltage at nodes 106 and 108 indicates zero deviation of the shaft 14 along the axis between electrodes 42 and 44.

Whenever the shaft 14 is physically perturbed so that it approaches one of the electrodes 42 or 44, the capacitances of capacitors 84 and 104 are changed. For example, should the shaft 14 move to the left as shown in FIG. 3, capacitor 84 is increased in capacitance while capacitor 104 is decreased in capacitance. The increase in capacitance of capacitor 84 causes the amplitude of the voltage oscillation across capacitor 84 to decrease. This drives the DC voltage across capacitor 70 more negative and the DC voltage across capacitor 72 more positive. Similarly the decrease in capacitance of capacitor 104 causes the amplitude of its voltage oscillation to increase. This drives the DC voltage across capacitor 92 less positive and the DC voltage across capacitor 94 less negative. The more negative voltage across capacitor 70 and the less positive voltage across capacitor 92 drive the voltage at node 106 negative, and the more positive voltage across capacitor 72 and the less negative voltage across capacitor 94 drive the voltage at node 108 positive.

The voltages that develop at nodes 106 and 108 can be applied to control circuitry to vary the current in the coils 26 of the electromagnetic bearing so the magnetic field attracting the shaft 14 towards electrode 42 is reduced and the magnetic field attracting shaft 14 toward electrode 44 is increased. As the shaft 14 is returned to the equilibrium position, the voltages at nodes 108 and 106 will be reduced so that corresponding adjustments in the magnetic field become smaller until the shaft 14 reaches the equilibrium position.

The voltage at nodes 106 and 108 are used to control the currents applied to coils 26 to maintain shaft 14 centered within the bearing. To do so, the signals at nodes 106 and 108 are combined with signals at analogous locations of another circuit, identical to that shown in FIG. 3, but coupled to electrodes 46 and 48.

In one specific embodiment illustrated in FIG. 1A, electrodes 42, 44, 46 and 48 are oriented at 45° angles relative to stator coils 26; thus, the electrodes measure the position of the shaft 14 along axes with are rotated 45° relative to the axes of coils 26. In this embodiment, the signals produced by the circuitry of FIG. 3 are combined to produce signals representative of deflection of the shaft 14 along the axes of the coils 26.

It will be noted that in the absence of control the bearing is a metastable system. When equal DC current is flowing in each of windings 26, a shaft 14 suspended at the center of the bearing will remain suspended in this position; however, any small mechanical perturbation of the shaft from this central position will generate a net force tending to continue to move the shaft in the direction of the perturbation. Specifically, if the shaft is perturbed from its central position, the gap between the shaft and the stator at the angular position of the perturbation will decrease, whereas this gap will increase at other angular positions. The reduced gap at the angular position of the perturbation will generate increased force tending to further perturb the shaft in this direction. Thus, any perturbation of the shaft from its metastable, centered position will rapidly result in the shaft being attracted to and attached to the stator.

To overcome the metastability of the bearing, the control circuit processing the position signals from the position sensor must have a complex system function such that the closed-loop system is stable. Specifically, the control circuit should include both a proportional gain term (i.e., creating a coil current at a rate proportional to the shaft position error) and also a differential gain term (i.e., creating a coil current at a rate proportional to the rate of change of the shaft position error).

It has been found that a position sensor 16 of the type described above, produces an output of roughly 15 Volts per millimeter of deviation of the shaft from its central position. With this output sensitivity from sensor 16, successful closed loop control has been achieved with an open-loop gain of 8.3 Amperes of coil current per volt output from the position sensor. The control circuit includes a zero on the negative real axis and three poles on the negative real axis. The open-loop half-power frequency is at 750 Hz and the 0 dB crossover is at 4170 Hz. The inclusion of a zero (differential gain term) in the system function produces a 24° phase lead at the 4170 Hz 0 dB crossover frequency (this phase lead being the result of 58° of phase lead produced by the zero and 34° of phase lag produced by the lowermost two poles). With these system function characteristics, the closed-loop system exhibited a moderate damping ratio of 0.24 and good stability.

While the present invention has been illustrated by a description of various embodiments and while these embodiments have been described in considerable detail, it is not the intention of the applicants to restrict or in any way limit the scope of the appended claims to such detail. For example, the bearing and position sensor described herein may be advantageously used in many applications other than cryogenic turbomachines. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus for sensing radial displacement of a member comprising:

a first electrical parameter sensor located proximate a first side of said member, said member being displaceable with respect to said first sensor along a first axis, said electrical parameter varying an electrical response of said sensor as a function of the distance between said first sensor and said member;

a second electrical parameter sensor located proximate a second side of said member, said member being displaceable with respect to said second sensor along said first axis, said electrical parameter varying an electrical response of said sensor as a function of the distance between said second sensor and said member;

means for coupling a first high frequency, AC electrical signal to said first sensor;

means for coupling a second high frequency, AC electrical signal to said second sensor, said second AC electrical signal being out-of-phase with respect to said first AC electrical signal; and means for summing said electrical response of said first sensor to said first electrical signal with the response of said second sensor to said second electrical signal to produce a deviation signal and to cancel AC ripple, said deviation signal being indicative of the displacement of the member from a position equidistant from said first sensor and said second sensor.

2. A member position sensor comprising:

means for inputting a high frequency, AC electrical signal;

means for generating an out-of-phase AC electrical signal from the high frequency, AC electrical signal;

first means for varying an electrical parameter in a predetermined relationship with respect to a distance between said first electrical parameter varying means and said member, said first electrical parameter varying means being electrically coupled to said inputting means to vary the high frequency, AC electrical signal as a function of said distance between said varying means and said member;

second means for varying an electrical parameter in a predetermined relationship with respect to a distance between said second electrical parameter varying means and said member, said second electrical parameter varying means being electrically coupled to said generating means to vary said out-of-phase, high frequency, AC electrical signal as a function of said distance between said first varying means and said member, said second electrical parameter varying means being diametrically opposed to said first electrical parameter varying means about said member; and first means for summing said varied signal from said first electrical parameter varying means with said varied signal from said second electrical parameter varying means to produce a first output signal indicative of the distance between said member and each of said first and second electrical parameter varying means and to cancel AC ripple.

3. The position sensor of claim 2 wherein said first electrical parameter varying means is directly connected to said inputting means and said second electrical parameter varying means is directly connected to said generating means.

4. The position sensor of claim 2 wherein said generating means generates a signal that is 180° out-of-phase with respect to the high frequency, AC electrical signal.

5. The position sensor of claim 2 further comprising:

third means for varying an electrical parameter in a predetermined relationship with respect to a distance between said third electrical parameter varying means and said member, said third electrical parameter varying means being electrically coupled to said inputting means to vary the high frequency, AC electrical signal independently of said first electrical parameter varying means;

fourth means for varying an electrical parameter in a predetermined relationship with respect to a distance between said fourth electrical parameter varying means and said member, said fourth electrical parameter varying means being electrically coupled to said generating means to condition the out-of-phase, high frequency, AC electrical signal independently of said electrical parameter varying means, said fourth electrical parameter varying means being diametrically opposed to said third electrical parameter varying means about said member, said third and said fourth electrical parameter varying means being orthogonally positioned with respect to said first and said second electrical parameter varying means; and second means for summing said varied signal from said third electrical parameter varying means with said varied signal from said fourth electrical parameter varying means to produce a second output signal indicative of the distance between said member and each of said third and said fourth electrical parameter varying means.

6. The sensor of claim 2 wherein said electrical parameter is an electrical capacitance.

7. The sensor of claim 2 wherein said electrical parameter is an electrical inductance.

8. A method for determining the distance to a member from a pair of diametrically opposed plates comprising:

varying a first electrical parameter between a first plate and the member in accordance with a predetermined relationship to the distance between the first plate and the member;

varying a second electrical parameter between a second plate and the member in accordance with a predetermined relationship to the distance between the second plate and the member;

varying a first high frequency, AC electrical signal with the first electrical parameter;

varying a second high frequency, AC electrical signal with the second electrical parameter, said second high frequency, AC electrical signal being 180° out-of-phase with respect to said first high frequency, AC electrical signal;

summing the first signal varied by the first electrical parameter with the second signal varied by the second electrical parameter to cancel the AC components of both signals so that the resulting DC component indicates the deviation distance and direction of deviation of the member from a position equidistant from both the first and the second plates.

9. The method of claim 8 further comprising:

varying a third electrical parameter between a third plate and the member in accordance with a predetermined relationship to the distance between the third plate and the member;

varying a fourth electrical parameter between a fourth plate and the member in accordance with a predetermined relationship to the distance between the fourth plate and the member;

varying the first high frequency, AC electrical signal with the third electrical parameter independently of the varying with the first electrical parameter;

varying the second high frequency, AC electrical signal with the fourth electrical parameter independently of the varying with the third electrical parameter;

summing the signal varied by the third electrical parameter with the signal varied by the fourth electrical parameter to cancel the AC components of both signals so that the resulting DC component indicates the deviation distance and direction of deviation of the member from a position equidistant from both the third and the fourth plates.

* * * * *